(12) United States Patent
Fujita et al.

(10) Patent No.: US 12,486,418 B2
(45) Date of Patent: Dec. 2, 2025

(54) ACTIVE ENERGY RAY CURING COMPOSITION, COMPRISING A POLYMERIZABLE MONOMER AND A POLYESTER RESIN

(71) Applicants: Yuusuke Fujita, Tokyo (JP); Satoshi Kojima, Kanagawa (JP); Hiroki Kobayashi, Kanagawa (JP); Yuuki Matsushita, Kanagawa (JP); Hikaru Ishii, Kanagawa (JP)

(72) Inventors: Yuusuke Fujita, Tokyo (JP); Satoshi Kojima, Kanagawa (JP); Hiroki Kobayashi, Kanagawa (JP); Yuuki Matsushita, Kanagawa (JP); Hikaru Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 18/065,520

(22) Filed: Dec. 13, 2022

(65) Prior Publication Data

US 2023/0183508 A1 Jun. 15, 2023

(30) Foreign Application Priority Data

Dec. 15, 2021 (JP) .................................. 2021-203711

(51) Int. Cl.
*C09D 11/38* (2014.01)
*B41M 7/00* (2006.01)

(52) U.S. Cl.
CPC ........... *C09D 11/38* (2013.01); *B41M 7/0081* (2013.01)

(58) Field of Classification Search
CPC ......... B05D 7/00; B05D 1/02; C09D 125/14; C09D 11/107; C09D 11/104; B41M 7/00; B32B 5/02; C08K 5/49; C09C 3/08
See application file for complete search history.

(56) References Cited

U.S. PATENT DOCUMENTS

| | | | |
|---|---|---|---|
| 2007/0138411 A1 | 6/2007 | Konarski et al. | |
| 2008/0038561 A1* | 2/2008 | Yoshizawa | C09D 133/16 428/411.1 |
| 2010/0243303 A1 | 9/2010 | Arifuku et al. | |
| 2013/0234370 A1 | 9/2013 | Suzuki et al. | |
| 2015/0192869 A1 | 7/2015 | Takezawa et al. | |
| 2016/0115302 A1* | 4/2016 | Rentsch | C08K 9/04 524/127 |

(Continued)

FOREIGN PATENT DOCUMENTS

| | | |
|---|---|---|
| CN | 111320895 | 6/2020 |
| EP | 2 055 757 | 5/2009 |

(Continued)

OTHER PUBLICATIONS

Extended European Search Report dated May 11, 2023, in European Application No. 22211523.0, 6 pages.

(Continued)

*Primary Examiner* — John P Zimmermann
(74) *Attorney, Agent, or Firm* — Grüneberg and Myers PLLC

(57) ABSTRACT

An active energy ray curing composition contains a polymerizable monomer having a phosphoric acid ester group and a polyester resin having an unsaturated bond and a number average molecular weight of 3,000 or less.

19 Claims, 2 Drawing Sheets

(56) References Cited

U.S. PATENT DOCUMENTS

| | | | |
|---|---|---|---|
| 2016/0122516 A1* | 5/2016 | Noro | C08L 1/12 |
| | | | 428/1.31 |
| 2017/0130082 A1 | 5/2017 | Sekiguchi et al. | |
| 2018/0148590 A1 | 5/2018 | Okawa et al. | |
| 2018/0230326 A1* | 8/2018 | Hase | C09D 167/02 |
| 2019/0002718 A1 | 1/2019 | Choi et al. | |
| 2020/0048482 A1 | 2/2020 | Sekiguchi et al. | |
| 2020/0048492 A1* | 2/2020 | Imai | B05D 1/36 |
| 2020/0148903 A1 | 5/2020 | Sato et al. | |
| 2020/0347181 A1* | 11/2020 | Honda | B29C 45/0001 |
| 2020/0399496 A1 | 12/2020 | Nonaka et al. | |
| 2021/0016327 A1 | 1/2021 | Atake et al. | |
| 2021/0245198 A1* | 8/2021 | Senda | B05D 7/572 |
| 2021/0292577 A1* | 9/2021 | Hayashi | B41J 2/17503 |
| 2021/0292578 A1 | 9/2021 | Nakagawa et al. | |

FOREIGN PATENT DOCUMENTS

| | | |
|---|---|---|
| EP | 3 321 335 | 5/2018 |
| JP | 57-170963 | 10/1982 |
| JP | 59-020305 | 2/1984 |
| JP | 2005-126540 | 5/2005 |
| JP | 2006-328227 | 12/2006 |
| JP | 2008-087248 | 4/2008 |
| JP | 2009-519827 | 5/2009 |
| JP | 2012-033495 | 2/2012 |
| JP | 2012-162615 | 8/2012 |
| JP | 2015-034240 | 2/2015 |
| JP | 2015-513601 | 5/2015 |
| JP | 2015-132640 | 7/2015 |
| JP | 2017-019899 | 1/2017 |
| JP | 2017-155240 | 9/2017 |
| JP | 2017-165104 | 9/2017 |
| JP | 2019-500467 | 1/2019 |
| JP | 2019-019208 | 2/2019 |
| JP | 2020-186372 | 11/2020 |
| JP | 2020-189949 | 11/2020 |
| JP | 2021-070731 | 5/2021 |
| JP | 6976802 | 12/2021 |
| KR | 10-2014-0076483 | 6/2014 |
| WO | WO2013/134110 A1 | 9/2013 |
| WO | 2018/105441 | 6/2018 |
| WO | 2020/184636 | 9/2020 |

OTHER PUBLICATIONS

Catalogue of Difunctional Monomers by Eternal, 1999, 108 pages with English translation.
Catalogue of Special Monomers by Sartomer company, Product Catalog, 2008, 2 pages, partial translation.
Japanese Office Action issued Mar. 29, 2022 in Japanese Patent Application No. 2021-203711, 5 pages.
Japanese Notice of Dispatch of Duplicates of a Written Opposition issued Mar. 23, 2023 in Japanese Patent No. 7124948, 23 pages.
Japanese Reasons for Revocation issued May 25, 2023 in Japanese Patent No. 7124948, 9 pages.
Japanese Office Action issued Sep. 12, 2023 in Japanese Patent Application No. 2022-126189, 4 pages.
Japanese Reasons for Revocation issued Jan. 25, 2024 in Japanese Patent No. 7124948, 142 pages.
Japanese Decision on Opposition issued Jun. 27, 2024 in Japanese Patent No. 7124948, 37 pages.
Japanese Notice of Dispatch of Duplicates of a Written Opposition issued Oct. 22, 2024 in Japanese Patent No. 7452587, 275 pages.
Kazumasa Inada, "Attachability of (meth) acrylate-based Photocurable Resin", No. 9, Trend 2006, pp. 19-24. partial translation.
Kayamer PM-2(JGLOBAL), NITE-CHRIP , Bismethacrylic acid (phosphinicobisoxybisethylene) ester, Cas 32435-46-4, 2024, 1 page, partial translation,.
Kinde chemical.com, Multifunctional acidic acrylate, CD 9051, Extracted on Feb. 8, 2013, 1 page. partial translation.
Matsushita Yasuaki, "The New Surface Decoration Technology by Inkjet Printing", Jul. 1, 2018, 10 pages with partial English translation.
Photomer 6010 HP, Aliphatic Urethane Triacrylate, Apr. 10, 2010, 2 pages with Partial English translation.
Photomer 6010 Product Data Sheet, Aliphatic Urethane Acrylate, 2010, Version 002, 8 pages with English translation.
Tadaya Kato et al., "Molecular Weight Distribution, one example of high polymer characterization", High polymers, Japan: Polymers, vol. 24, No. 7, Jul. 1975, 8 pages with partial translation.

* cited by examiner

ACTIVE ENERGY RAY CURING COMPOSITION, COMPRISING A POLYMERIZABLE MONOMER AND A POLYESTER RESIN

CROSS-REFERENCE TO RELATED APPLICATIONS

This patent application is based on and claims priority pursuant to 35 U.S.C. § 119 to Japanese Patent Application No. 2021-203711, filed on Dec. 15, 2021, in the Japan Patent Office, the entire disclosure of which is hereby incorporated by reference herein.

BACKGROUND

Technical Field

The present disclosure is related to an active energy ray curing composition, active energy ray curing ink composition, active energy ray curing inkjet ink composition, a composition container, an apparatus for forming a two-dimensional or three-dimensional image, a method of forming a two-dimensional or three-dimensional image, cured matter, a decorative object, a member for flexible device, and a flexible device.

Description of the Related Art

Inkjet printers are now applied in many industrial fields including printing text and images on a large-sized commercial advertisement, wall paper, packages, and beverage containers. Inkjet printers use ink compositions such as aqueous inkjet ink compositions, oil inkjet ink compositions, and active energy ray curing inkjet ink compositions.

The active energy ray curing composition cures upon exposure to radiation of active energy rays and dries quickly on a non-permeating substrate.

Cured matter obtained by curing a printed active energy ray curing composition is required to be durable to a treatment under an extremely severe condition. For an application of the cured matter to a field of eating and drinking including beverage containers, the container is often treated with hot water or an alkali solution for sterilization. Cured matter obtained by curing a printed active energy ray curing composition is required to endure a treatment under an extremely severe condition.

SUMMARY

According to embodiments of the present disclosure, an active energy ray curing composition is provided which contains a polymerizable monomer having a phosphoric acid ester group and a polyester resin having an unsaturated bond and a number average molecular weight of 3,000 or less.

As another aspect of embodiments of the present disclosure, an active energy ray curing ink composition is provided which contains the active energy ray curing composition mentioned above.

As another aspect of embodiments of the present disclosure, an active energy ray curing inkjet ink composition is provided which contains the active energy ray curing ink composition mentioned above.

As another aspect of embodiments of the present disclosure, a composition container is provided which includes a container containing at least one of the active energy ray curing composition mentioned above, an active energy ray curing ink composition containing the active energy ray curing composition, and an active energy ray curing inkjet ink composition containing the active energy ray curing ink composition.

As another aspect of embodiments of the present disclosure, an apparatus for forming a two-dimensional or three-dimensional image is provided which includes the composition container mentioned above and an irradiator for emitting active energy rays.

As another aspect of embodiments of the present disclosure, a method of forming a two-dimensional or three-dimensional image is provided which includes exposing at least one of the active energy ray curing composition mentioned above, an active energy ray curing ink composition comprising the active energy ray curing composition, and an active energy ray curing inkjet ink composition comprising the active energy ray curing ink composition to active energy ray.

As another aspect of embodiments of the present disclosure, cured matter is provided which is produced by a method of curing at least one of the active energy ray curing composition mentioned above, an active energy ray curing ink composition comprising the active energy ray curing composition, and an active energy ray curing inkjet ink composition comprising the active energy ray curing ink composition to active energy rays.

As another aspect of embodiments of the present disclosure, a decorative object is provided which includes a substrate and a surface decoration of the cured matter mentioned above on the substrate.

As another aspect of embodiments of the present disclosure, a laminate is provided which includes a glass substrate, cured matter of at least one of the active energy ray curing composition mentioned above, an active energy ray curing ink composition containing the active energy ray curing composition, and an active energy ray curing inkjet ink composition containing the active energy ray curing ink composition laminated on the glass substrate, and a resin film laminated on the cured matter.

As another aspect of embodiments of the present disclosure, a member for flexible device is provided which includes the laminate mentioned above.

As another aspect of embodiments of the present disclosure, a flexible device is provided which includes the laminate mentioned above.

As another aspect of embodiments of the present disclosure, an active energy ray curing composition is provided which contains a polymerizable monomer having a phosphoric acid ester group and a polyester resin having an unsaturated bond, wherein the polyester resin accounts for 3 to 15 percent by mass of the active energy ray curing composition.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
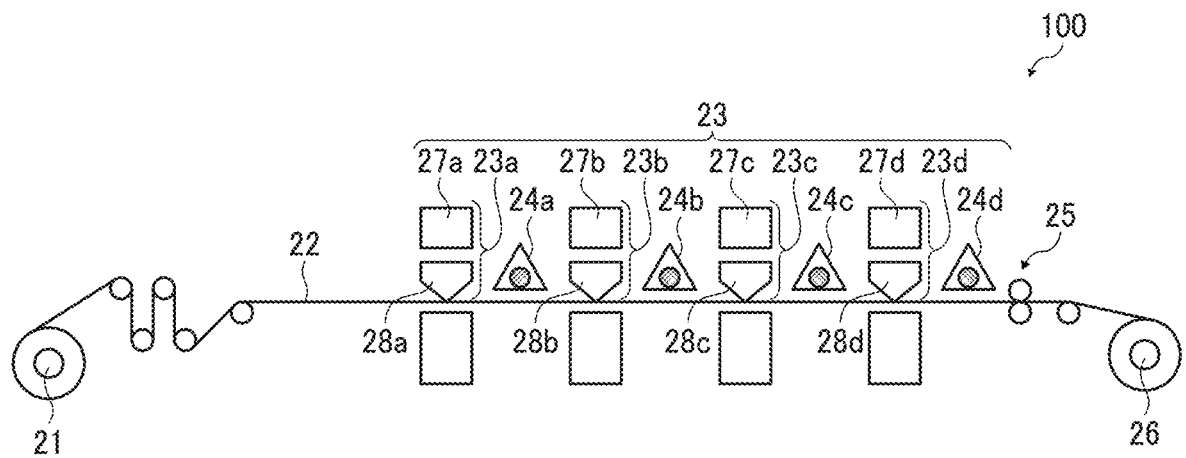
FIG. 1 is a schematic diagram illustrating an apparatus for forming a two-dimensional or three-dimensional image according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an active energy ray curing composition is provided which can form cured matter having a strong adhesion even after the cured matter is placed under an extremely sever condition such as immersing in hot water or an alkali solution.

Active Energy Ray Curing Composition

The active energy ray curing composition of the present disclosure contains a polymerizable monomer having a phosphoric acid ester group, a polyester resin, and other optional components.

A curable composition having an excellent adhesion, thermal resistance, and moisture resistance has been proposed in Japanese Unexamined Patent Application Publication No. 2015-034240, which contains isosorbide di(meth) acrylate (A), monovalent organic acid (B), a radical initiator (C), an acid generator (D). Another composition proposed therein contains (A), (B), (C), (D), and a radical polymerizable substance (E) other than (A).

An inkjet ink composition that can produce a resin-covered metal plate including a resin film having a high strength and strong adhesion to metal has been proposed in Japanese Unexamined Patent Application Publication No. 2012-162615. The composition contains a polymerizable monomer polymerizable upon irradiation of active energy rays and a photopolymerization initiator and it has a viscosity of from 3 to 50 mPa·s at 25 degrees C. The polymerizable monomer contains a polymerizable phosphoric acid ester compound having a phosphoric acid ester group and an ethylenic double bond in its molecule in an amount of from 0.5 to 13 percent by mass and a monofunctional monomer having a single ethylenic double bond without a phosphoric acid ester group in its molecule in an amount of from 10 to 75 percent by mass in the entire monomers. The photopolymerization initiator contains acylphosphine oxide-based initiator and $\alpha$-hydroxy ketone-based initiator having one or less phenyl group in its backbone.

Moreover, an energy curable ink or coating composition for printing has been proposed as an energy curable ink and coating composition having improved adhesion to a flexible substrate such as flexible film in Japanese Translation of PCT International Application Publication No. JP-T-2015-513601. The ink or coating composition contains, for example, a monomer having an acrylate group, an oligomer having an acrylate group, or a combination thereof and it has an acrylate group relative concentration surpassing 4.0.

The curable composition of Japanese Unexamined Patent Application Publication No. 2015-034240 mentioned above has been discussed about the thermal resistance and moisture resistance but not about the hot water resistance. Moreover, whether cured matter obtained from the curing composition is still adhesive even after the composition is exposed to an extremely severe condition such as immersing in hot water and an alkali solution is not discussed.

The inkjet ink composition of Japanese Unexamined Patent Application Publication No. 2012-162615 mentioned above has been discussed about the adhesion but not about whether the adhesion deteriorates after being immersed in hot water or an alkali solution. For the energy curable ink or coating composition for printing in the Japanese Translation of PCT International Application Publication No. JP-T-2015-513601 mentioned above, substances such as acidic acrylate oligomers, acrylic acid, $\beta$-carboxy ethylacrylate alone are specified as acidic modified adhesion promoters. Moreover, the adhesion of the composition is discussed but whether cured matter obtained from the composition is still adhesive even after the composition is exposed to an extremely severe condition such as immersing in hot water and an alkali solution is not discussed.

As a result of an investigation, the inventors of the present invention have found that an active energy ray curing composition containing a polymerizable monomer having a phosphoric acid ester group and a polyester resin maintains excellent adhesion even after the composition is subjected to a treatment under an extremely severe condition such as hot water and an alkali solution.

This mechanism is not clear but can be inferred as follows.

When an active energy ray curing composition is applied to a non-permeating substrate such as glass, the composition does not permeate a substrate so that cured matter of the composition does not adhere to a substrate well.

However, by using a polymerizable monomer having a phosphoric acid ester group, the fundamental part of the phosphoric acid ester group dissolves a substrate and allows the mutual action between the substrate and the compound, resulting in an extremely high adhesion between both.

In addition, the polyester resin enhances the adhesion between them and is considered to have a good affinity with the polymerizable monomer having a phosphoric acid ester group having a structure similar to that of a polyester. Therefore, cured matter formed on a substrate is inferentially solid, which prevents aggregation break of the cured matter.

When a substrate and cured matter formed on the substrate are immersed in hot water or an alkali solution, the hot water or the alkali solution permeates the interface between the substrate and the cured matter or the inside of the cured matter. After the immersion, the adhesion between the substrate and the cured matter may extremely weaken.

However, a composition containing a polymerizable monomer having a phosphoric acid ester group and a polyester resin extremely enhances the interaction between a substrate and cured matter or the strength of the cured matter. The composition can therefore prevent hot water or an alkali solution from penetrating the interface between the substrate and the cured matter or the inside of the cured matter, so that the cured matter sticks firmly to the substrate even after the substrate and the cured matter are dipped in hot water or an alkali solution.

In the specification of the present disclosure, hot water refers to water heated to 80 degrees C. or higher under normal pressure, meaning that hot water from 80 to 100 degrees C. at normal pressure.

Polymerizable Monomer Having Phosphoric Acid Ester Group

The active energy ray curing composition of the present disclosure contains a polymerizable monomer having a phosphoric acid ester group. In the present disclosure, the phosphoric acid group of the polymerizable monomer having a phosphoric acid ester group dissolves a substrate such as glass, thereby enhancing the interaction between the substrate and the composition. Therefore, the cured matter sticks firmly to the substrate.

The polymerizable functional group in the polymerizable monomer having a phosphoric acid ester group is not particularly limited and can be suitably selected to suit to a particular application. One of the functional groups is (meth) acrylate.

The polymerizable monomer having a phosphoric acid ester group is preferably a polyfunctional monomer having two or more polymerizable functional groups and more preferably three polymerizable functional groups in a molecule.

A polymerizable monomer having a phosphoric acid ester group having two or more polymerizable functional groups in a molecule enables cured matter to stick firmly to a substrate even after both are dipped in hot water or an alkali solution.

Specific examples of the polymerizable monomer having a phosphoric acid ester group include, but are not limited to, 2-acryloyloxy ethyl acid phosphate (number of polymerizable functional groups: 1), 2-meth(acryloyloxy ethyldihydrogen phosphate (number of polymerizable functional groups: 1), and dipentaerythritol penta(meth)acryloyloxy dihydrogenphosphate (number of polymerizable functional groups: 5). These can be used alone or in combination.

The polymerizable monomer having an acidic group can be procured.

Specific examples of the products include, but are not limited to, SR9050NS (number of polymerizable functional groups: 1, manufactured by Sartomer Company), SR9051NS (number of polymerizable functional groups: 3, manufactured by Sartomer Company), and Light Acrylate P-1A (N), (number of polymerizable functional groups: 1, manufactured by Kyoeisha Chemical Co., Ltd.).

The proportion of the polymerizable monomer having a phosphoric acid ester group is preferably from 3 to 10 percent by mass to the entire of a composition.

A proportion of the polymerizable monomer having a phosphoric acid ester group of from 3 to 10 percent by mass to the entire of a polymerizable monomer having a phosphoric acid ester group demonstrates an excellent adhesion between cured matter and a substrate even after both are immersed in hot water or an alkali solution. Moreover, a proportion of the polymerizable monomer having a phosphoric acid ester group of from 3 to 10 percent by mass to the entire of a polymerizable monomer having a phosphoric acid ester group makes it possible to obtain an active energy ray curing composition having excellent durability to liquid in contact and discharging stability.

Liquid in contact means a contact between an active energy ray curing composition and a member like a jig such as an inkjet head for inkjet printing that is used for imparting the active energy ray curing composition.

A metal part in contact with liquid is subject to deterioration when the proportion of the polymerizable monomer having a phosphoric acid ester group surpasses 10 percent by mass. Therefore, the proportion is preferably 10 percent by mass or less.

Polyester Resin

The polyester resin mentioned above is not particularly limited and can be suitably selected to suit to a particular application.

Since the polyester resin has a chemical structure similar to that of the phosphoric acid ester group in a polymerizable monomer having a phosphoric acid ester group, each molecule has a high affinity. A combinational use of the polyester resin mentioned above and the monomer having a phosphoric acid ester group hardens obtained cured matter more, furthermore reducing the aggregation break of the cured matter.

In terms of the compatibility of the polymer resin with monomers such as an organic solvent, the polyester resin is preferably dissolved in the monomer or organic solvent. These can be used alone or in combination.

The polyester resin can be procured.

Specific examples of marketed products include, but are not limited to, UVAD-081 (number average molecular weight of 1,400, manufactured by OSAKA SODA CO., LTD.), UVAD-085 (number average molecular weight of 2,000, manufactured by OSAKA SODA CO., LTD.), VYLON GK-810 (number average molecular weight of 6,000, manufactured by TOYOBO CO., LTD.), VYLON 200 (number average molecular weight of 17,000, manufactured by TOYOBO CO., LTD.), and VYLON GK-360 (number average molecular weight of 16,000, manufactured by TOYOBO CO., LTD.), and VYLON 600 (number average molecular weight of 16,000, manufactured by TOYOBO CO., LTD.).

The polyester resin preferably has an unsaturated bond. A polyester resin having an unsaturated bond enables cured matter and a substrate to firmly adhere to each other even after both are immersed in hot water or an alkali solution.

Specific examples of the polyester resin having an unsaturated bond include, but are not limited to, UVAD-081 (number average molecular weight of 1,400, manufactured by OSAKA SODA CO., LTD.) and UVAD-085 (number average molecular weight of 2,000, manufactured by OSAKA SODA CO., LTD.).

The polyester resin mentioned preferably has a number average molecular weight of 3,000 or less, more preferably 2,000 or less, and furthermore preferably from 500 to 2,000. The polyester resin having a number average molecular weight of 3,000 or less enhances the adhesion between cured matter and a substrate. The polyester resin having a number average molecular weight of 3,000 or less enhances the discharging stability of a composition.

The proportion of the polyester resin to the entire of a composition is preferably from 3 to 15 percent by mass, more preferably from 3 to 10 percent by mass, and furthermore preferably from 5 to 10 percent by mass. A proportion of the polyester resin of from 3 to 15 percent by mass enables cured matter and a substrate to firmly adhere to each other even after both are immersed in hot water or an alkali solution. A proportion of the polyester resin of from 3 to 15 percent by mass enhances the discharging stability of a composition.

Other Components

The other components mentioned above include, but are not limited to, a polymerizable compound other than the polymerizable monomer having a phosphoric acid ester group, a polymerization initiator, a polymerization promoter, a coloring material, and an organic solvent.

Polymerizable Compound Other than Polymerizable Monomer Having Phosphoric Acid Ester Group The polymerizable compounds other than the polymerizable monomer having a phosphoric acid ester group is not particularly limited and can be known compounds.

The other polymerizable compounds include, but are not limited to, polymerizable monomers and polymerizable oligomers.

Specific examples of such compounds include, but are not limited to, monofunctional polymerizable compounds such as tetrahydro furfuryl acrylate, phenoxy ethylacrylate, 2-hydroxy ethylacrylate, ethylacrylate, 2-hydroxy propylacrylate, isobutylacrylate, t-butylacrylate, cyclic trimethylol propane formal monoacrylate, imideacrylate, 2,2,2-trifluoro ethylacrylate, N-vinylformamide, cyclohexyl acrylate, benzylacrylate, 4-t-butylcyclohexyl acrylate, caprolactone-modified tetrahydro furfuryl acrylate, ethoxylated tribromophenyl acrylate, phenoxy diethylene glycol acrylate, vinyl pyrrolidone, 2-hydroxy-3-phenoxy propyl acrylate, 1,4-cyclohexane dimethanol monoacrylate, stearyl acrylate, lauryl acrylate, 3,3,5-trimethyl cyclohexyl acrylate, ethoxylated nonylphenyl acrylate, alkoxylated 2-phenoxy ethyl acrylate, phenoxy polyethylene glycol acrylate, dimethylacryl amide, hydroxyethyl acrylamide, itopropyl acrylamide, diethyl acrylamide, and dimethylamino propyl acrylamide, and polyfunctional polymerizable compounds such as pentaerythritol tri(meth)acrylate, dipropylene glycol diacrylate, tripropylene glycol diacrylate, trimethylol propane triacrylate, pentaerythritol tetra(meth)acrylate, dipentaerythritol (meth)hexaacrylate, trimethylol propane tri(meth)acrylate, tetramethylol methane tetra(meth)acrylate, trimethylol ethane tri(meth)acrylate, tetramethylol methane tetra(meth)acrylate, trimethylol ethane tri(meth)acrylate, trimethylol propane tri(meth)acrylate, 3-methyl-1,5-pentane diol di(meth)acrylate, 1,6-hexane diol di(meth)acrylate, 1,9-nonane diol di(meth)acrylate, 1,3-butylene glycol di(meth)acrylate, 1,10-decane diol di(meth)acrylate, hydroxy pivalic acid neopentyl glycol di(meth)acrylate, tetramethylol methane tri(meth)acrylate, dimethylol tricyclodecane di(meth)acrylate, modified glycerin tri(meth)acrylate, an adduct of bisphenol A with diglycidyl ether(meth)acrylic acid, modified bisphenol A di(meth)acrylate, dipentaerythritol hexa(meth)acrylate, an adduct of hydroxy pivalic acid with neopentyl glycol(meth)acrylate, 2-hydroxy-3-acryloyloxy propyl methacryalte, urethane acrylate oligomer, pentaerythritol tri(meth)acrylate hexamethylene diisocyanate urethane prepolymer, ditrimethylol propane tetra(meth)acrylate, and pentaerythritol tri(meth)acrylate hexamethylene diisocyanate urethane polymer.

These can be used alone or in combination.

Note that, an adduct of (meth)acrylic acid ester means an adduct of acrylic acid or an adduct of methacrylic acid, and (meth)acrylate means an acrylate or a methacrylate.

The polymerizable compound other than the polymerizable monomer having a phosphoric acid ester group is preferably a polyfunctional monomer having two or more polymerizable functional groups in a molecule.

The proportion of the polyfunctional monomer having two or more polymerizable functional groups to the entire of a composition is preferably 25 percent by mass or less, more preferably 15 percent by mass or less, and furthermore preferably 10 percent by mass or less. A proportion of a polyfunctional monomer having two or more polymerizable functional groups in a molecule of 25 percent by mass or less enables cured matter to stick firmly to a substrate even after both are dipped in hot water or an alkali solution.

Polymerization Initiator

The active energy ray curing composition of the present disclosure may contain a polymerization initiator. The polymerization initiator is not particularly limited as long as it produces active species such as a radical or a cation upon an application of energy of active energy radiation, which initiates polymerization of a polymerizable compound (monomer or oligomer). The polymerization initiator can be a known radical polymerization initiator, a cation polymerization initiator, a base producing agent, or a combination thereof. Of these, radical polymerization initiators are preferable. Moreover, the polymerization initiator preferably accounts for 5 to 20 percent by mass of the entire (100 percent by mass) of a composition to achieve a sufficient curing speed.

Specific examples of the radical polymerization initiators include, but are not limited to, aromatic ketones, acylphosphineoxide compounds, aromatic oniumchlorides, organic peroxides, thio compounds such as thioxanthone compounds, compounds including thiophenyl groups, hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator or sensitizer can be optionally used together with the polymerization initiator. The polymerization accelerator is not particularly limited. Preferred examples thereof include, but are not limited to, amine compounds such as trimethylamine, methyldimethanolamine, triethanolamine, p-diethylaminoacetophenone, p-dimethylaminoethylbenzoate, p-dimethyl aminobenzoate-2-ethylhexyl, N,N-dimethylbenzylamine, and 4,4'-bis(diethylamino)benzophenone. The content can be suitably determined to suit to the identification and the content of the polymerization initiator used in combination with the polymerization accelerator.

Coloring Material

The active energy ray curing composition of the present disclosure may contain a coloring material. Pigments and dyes can be added as a coloring material in accordance with the objectives and requisites of the composition of the present disclosure. These demonstrate black, white, magenta, cyan, yellow, green, orange, and gloss color such as gold and silver. The proportion of the coloring agent is not particularly limited and determined considering the desired color density and dispersibility of the coloring agent in the curing composition. Preferably, the proportion of the coloring agent accounts for 0.1 to 20 percent by mass of the entire (100 percent by mass) of the composition. The active energy ray curing composition of the present disclosure can be clear and colorless without containing a coloring agent. If no coloring agent is present in a curing composition, the composition is suitable as an overcoat layer for protecting an image.

An inorganic or organic pigment can be used alone or in combination as the pigment.

Specific examples of the inorganic pigment include, but are not limited to, carbon blacks (C.I. PIGMENT BLACK 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

The dye includes, for example, an acidic dye, direct dye, reactive dye, and basic dye. These can be used alone or in combination.

Organic Solvent

The active energy ray curing composition of the present disclosure optionally contains an organic solvent, although it is preferable to spare it. A composition free of an organic solvent, in particular a volatile organic compound (VOC), is preferable because it enhances safeness at places where the composition is handled, thereby preventing the environment contamination. "Organic solvent" represents a non-reactive organic solvent such as ether, ketone, xylene, ethylacetate, cyclohexanone, or toluene, which is clearly distinguished from a reactive monomer. Furthermore, "free of" an organic solvent means that no organic solvent is substantially contained. The proportion thereof is preferably less than 0.1 percent by mass.

Other Components

The active energy ray curing composition of the present disclosure may optionally contain other known components. The other known components are not particularly limited. Examples are known additives such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulators, and thickeners.

Preparation of Active Energy Ray Curing Composition

The active energy ray curing composition of the present disclosure can be prepared by using the components described above. The preparation devices and conditions are not particularly limited. For example, the curing composition can be prepared by charging substances such as a polymerizable monomer, a pigment, and a dispersant into a dispersing machine such as a ball mill, kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the active energy ray curing composition of the present disclosure is not particularly limited and can be suitably adjusted to suit to a particular application. It is preferably 40 mPa·s or less and more preferably 30 mPa·s or less at 25 degrees C. to enhance the interaction and adhesion between a substrate and an active energy ray curing composition. Viscosity can be measured by a cone plate rotary viscometer (VISCOMETER TVE-25L, manufactured by TOKI SANGYO CO., LTD.) using a cone rotor (1° 34'× R24) at 50 rotations per minute (rpm) at 25 degrees C. kept by hemathermal circulating water. The temperature of the circulating water can be controlled with a VISCOMATE VM-150III.

Active Energy Ray

The active energy rays for use in curing the active energy ray curing composition of the present disclosure is not particularly limited as long as it can apply energy required to allow the polymerization reaction of the polymerizable composition in the active energy ray curing composition. Specific examples include, but are not limited to, electron beams, α rays, β rays, γ rays, and X rays, in addition to ultraviolet radiation. In an embodiment in which a particularly high energy light source is used, polymerization occurs without a polymerization initiator. In addition, mercury-free is strongly preferable to protect the environment when ultraviolet is used. Using a GaN-based semiconductor ultraviolet light-emitting device is excellent from industrial and environmental points of view. Furthermore, ultraviolet light-emitting diodes (UV-LED) and ultraviolet laser diodes (UV-LD) are preferable as an ultraviolet light source because they have small sizes, long working life, and high efficiency, and enjoy high cost performance.

Application Field

The application field of the active energy ray curing composition of the present disclosure is not particularly limited. It can be applied to any field where the active energy ray curing composition is used. The composition is selected to suit to a particular application. Examples include, but are not limited to, a resin for use in molding, a paint, an adhesive, an insulant, a releasing agent, a coating material, a sealing material, resists, and optical materials. The active energy ray curing composition of the present disclosure can be used as an ink to form two-dimensional text, images, and designed coating film on various substrates and in addition as a solid object forming material for forming a three-dimensional object. This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in stereolithography as illustrated in FIG. 2 and FIGS. 3A to 3D.

Figure 2:
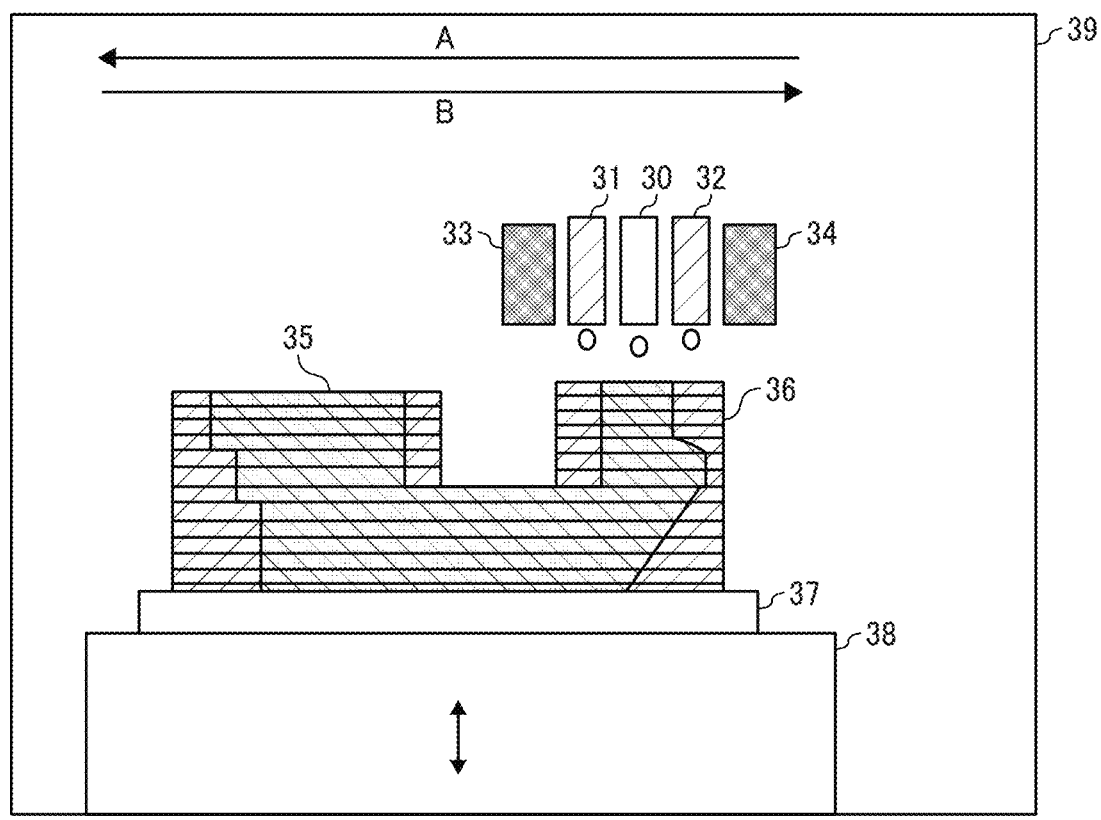
FIG. 2 is a schematic diagram illustrating an apparatus for forming a two-dimensional or three-dimensional image according to another embodiment of the present invention.

FIG. 2 is a diagram illustrating a method of discharging the active energy ray curing composition of the present disclosure to a particular area followed by curing upon irradiation of active energy to form a layer and laminating the layers (detail of which is described later). FIGS. 3A to 3D are diagrams illustrating a method of irradiating a pool (accommodating unit) 1 of the active energy ray curing composition 5 of the present disclosure with active energy ray 4 to form a cured layer 6 having a particular form on a movable stage 3 and sequentially laminating the cured layer 6 so that a solid freeform fabrication object is obtained.

Figure 3A:
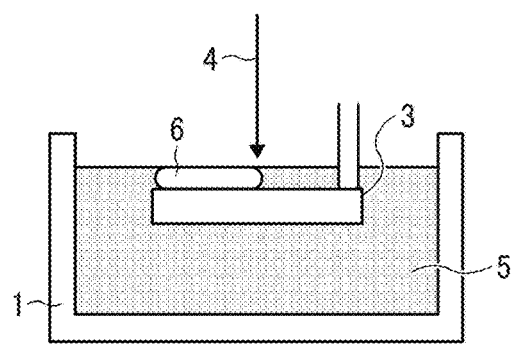
FIG. 3A is a schematic diagram illustrating an apparatus for forming a two-dimensional or three-dimensional image according to another embodiment of the present invention.
Figure 3B:
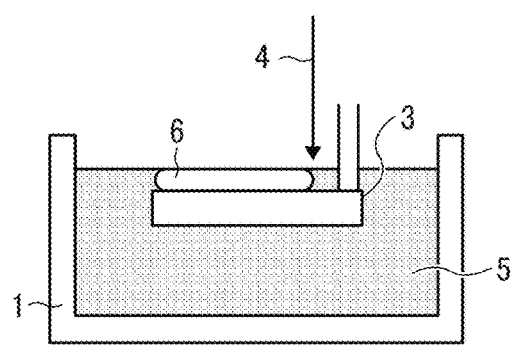
FIG. 3B is a schematic diagram illustrating the apparatus for forming a two-dimensional or three-dimensional image according to another embodiment of the present invention.
Figure 3C:
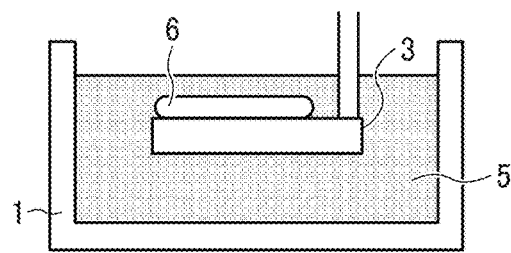
FIG. 3C is a schematic diagram illustrating the apparatus for forming a two-dimensional or three-dimensional image according to another embodiment of the present invention.
Figure 3D:
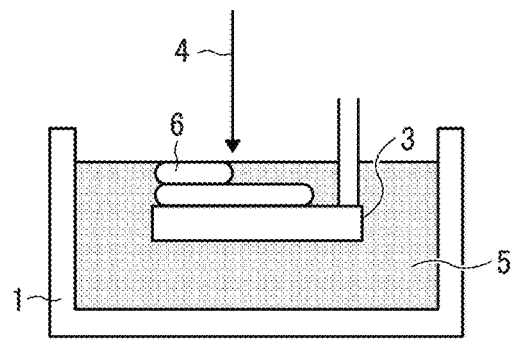
FIG. 3D is a schematic diagram illustrating the apparatus for forming a two-dimensional or three-dimensional image according to another embodiment of the present invention.

In FIG. 3A, the pool 1 of the active energy ray curing composition 5 of the present disclosure is exposed to the active energy ray 4. In FIG. 3B, the cured layer 6 having a particular shape is formed on the movable stage 3 owing to the exposure to the active energy ray 4. In FIG. 3C, the movable stage 3 is lowered. In FIG. 3D, another cured layer 6 is formed on the formed cured layer 6 owing to the exposure to the active energy ray 4.

Solid freeform fabrication objects can be fabricated with the active energy ray curing composition of the present disclosure using a known device without any particular limitation. The device can be suitably selected to suit to a particular application. Such a device includes an accommodating unit, a supplying device, and a discharging device of the curing composition and an active energy ray irradiator.

In addition, the present disclosure includes cured matter obtained by curing the active energy ray curing composition and a mold product obtained by processing a structure formed of a substrate and the cured matter on the substrate. The mold-processed product is manufactured from cured matter or a structure having a sheet-like form and film-like form by, for example, heating drawing or punching. The mold-processed product is suitably used to produce items surface-decorated after molding such as gauges or operation panels of vehicles, office machines, electric and electronic devices, and cameras.

The substrate mentioned above is not particularly limited and can be suitably selected to suit to a particular application. The substrate includes paper, string, fiber, fabric, leather, metal, plastics, glass, wood, ceramics, and their composites. The active energy ray curing composition of the present disclosure can form good cured matter particularly on a non-permeating substrate such as metal, plastics, glass, and ceramics.

The substrate may take a form such as a planar substrate or a non-planar form such as a bottle.

The active energy ray curing composition of the present disclosure can be used alone or in combination with other compositions.

One way of combining with another composition is to apply a composition such as a pigment-containing composition onto the active energy ray curing composition of the present disclosure applied to a substrate to obtain a primer of the active energy ray curing composition of the present disclosure.

Active Energy Ray Curing Ink Composition

The active energy ray curing ink composition of the present disclosure contains the active energy ray curing composition mentioned above and other optional components.

Active Energy Ray Curing Inkjet Ink Composition

The active energy ray curing inkjet ink composition of the present disclosure contains the active energy ray curing ink composition of the present disclosure and other optional components.

Composition Container

The composition container of the present disclosure contains at least one of the active energy ray curing composition of the present disclosure, the active energy ray curing ink composition of the present disclosure, or the active energy ray curing inkjet ink composition of the present disclosure. The container is suitably used in the application field mentioned above. If the active energy ray curing composition of the present disclosure is used as ink, the container containing the ink can be used as an ink cartridge or an ink bottle. Therefore, users can avoid direct contact with the ink during operations such as transfer or replacement of the ink, so that the users can keep the fingers and clothes clean. In addition, the ink is prevented from mixing with foreign matter such as dust. The container can be of any size, any form, and any material. For example, the container can be designed to suit to a particular application. The container is preferably made of a light blocking material or covered with materials such as a light blocking sheet.

Apparatus for Forming Two-Dimensional or Three-Dimensional Image and Method of Forming Two-Dimensional or Three-Dimensional Image The apparatus for forming a two-dimensional or three-dimensional image of the present disclosure includes the composition container of the present disclosure and an irradiator for emitting active energy rays. The apparatus may include a discharging device for discharging an active energy ray curing composition and other optional devices.

The method of forming a two-dimensional or three-dimensional image of the present disclosure exposes at least one of the active energy ray curing composition of the present disclosure, the active energy ray curing ink composition of the present disclosure, or the active energy ray curing inkjet ink composition of the present disclosure to active energy rays and other optional processes.

The apparatus for forming a two-dimensional or three-dimensional image of the present disclosure is also referred to as an image forming apparatus.

The method of forming a two-dimensional or three-dimensional image of the present disclosure is also referred to as an image forming method.

The image forming method of the present disclosure includes at least exposing the active energy ray curing composition of the present disclosure to active energy rays to cure the active energy ray curing composition.

The image forming apparatus of the present disclosure includes an irradiator for exposing the active energy ray curing composition of the present disclosure to active energy rays and an accommodating unit for containing the active energy ray curing composition of the present disclosure. The accommodating unit may include the composition container mentioned above. Furthermore, the method and the apparatus may respectively include a discharging step and a discharging device for discharging the active energy ray curing composition. The method of discharging the curing composition is not particularly limited, including a continuous spraying method and an on-demand method. The on-demand method includes methods such as a piezo method, a thermal method, and an electrostatic method.

The active energy ray is preferably light and particularly preferably ultraviolet having a wavelength of from 220 to 400 nm. Active energy is not particularly limited so long as it is able to impart energy necessary for allowing polymerization reaction of polymerizable components in the composition. Examples of the active energy include, but are not limited to, electron beams, α-rays, ß-rays, γ-rays, and X-rays, in addition to ultraviolet radiation. In an embodiment in which a particularly high energy light source is used, polymerization occurs without a polymerization initiator. In addition, mercury-free is strongly preferable to protect the environment when ultraviolet is used. Using a GaN-based semiconductor ultraviolet light-emitting device is excellent from industrial and environmental points of view. Furthermore, ultraviolet light-emitting diodes (UV-LED) and ultraviolet laser diodes (UV-LD) are preferable as ultraviolet light source because they have small sizes, long working life, and high efficiency, and enjoy high cost performance.

FIG. 1 is a diagram illustrating an image forming apparatus 100 including the discharging device mentioned above.

Printing units 23a, 23b, 23c, and 23d respectively have ink cartridges 27a, 27b, 27c, and 27d as composition containers and discharging heads 28a, 28b, 28c, and 28d for yellow, magenta, cyan, and black active energy ray curing ink compositions. The units discharge the active energy ray curing ink compositions onto a substrate (or printing medium) 22 fed from a supplying roll 21. Thereafter, irradiators (or light sources) 24a, 24b, 24c, and 24d emit active energy rays to the inks to cure them, thereby forming a color image. Thereafter, the recording medium 22 is conveyed to a processing unit 25 and a printed matter reeling roll 26. Each of the printing units 23a, 23b, 23c, and 23d may include a heating assembly for liquidizing the ink at the ink discharging unit. In addition, a mechanism may be optionally disposed which cools down a printing medium to an ambient temperature in a contact or non-contact manner. The inkjet printing method includes a serial method including discharging an ink onto a printing medium that continually moves in accordance with the width of a discharging head while moving the head and a line method including discharging an ink onto a printing medium that continuously moves from a discharging head fixed at a particular position.

The printing medium 22 is not particularly limited. Specific examples thereof include, but are not limited to, paper, film, metal, or complex materials thereof. The printing medium 22 takes a sheet-like form but is not limited thereto. The apparatus for forming an image may have a simplex printing configuration capable of printing an image on one side of a substrate or a duplex printing configuration capable of printing an image on both sides thereof. In addition, the light source 24d may expose the image to active energy rays after an image of multiple colors is printed with no or faint active energy rays from the light sources 24a, 24b, and 24c. This configuration saves energy and cost.

The print matter printed with the ink of the present disclosure includes items having printed text or images on a plain surface of a medium including conventional paper and resin film, items having printed text or images on a rough surface, and items having printed text or images on a surface made of various materials such as metal or ceramic. In addition, by laminating layers of two-dimensional images on a printing medium, a partially stereoscopic image (formed of a two dimensional part and a three-dimensional part) or a three dimensional object can be fabricated.0003

FIG. 2 is a schematic diagram illustrating another example of the image forming apparatus (apparatus for fabricating a three-dimensional image) related to the present disclosure. An image forming device 39 illustrated in FIG. 2 stacks layers by: discharging the first active energy ray curing composition from a discharging head unit 30 for fabrication and a second active energy ray curing composition composed of different ingredients from that of the first active energy ray curing composition from discharging head units 31 and 32 for a support by using a head unit having inkjet heads disposed movable in the directions indicated by the arrows A and B; curing each composition with ultraviolet irradiators 33 and 34 disposed adjacent to the discharging head units 31 and 32 respectively; and repeating the discharging and the curing. For example, the discharging head units 31 and 32 for a support discharge the second active energy curing composition onto a substrate 37 for fabrication. The second active energy curing composition is solidified at exposure to active energy radiation, thereby forming a first support layer having a hollow space (pool) for fabrication. The discharging head unit 30 for fabrication discharges the first active energy curing composition onto the hollow space followed by exposure to active energy radiation for solidification, which forms a first fabrication layer. This step is repeated multiple times in accordance with the required number of lamination while moving the stage 38 up and down in the vertical direction to laminate the support layer and the fabrication layer. A solid freeform fabrication object 35 is thus created. Thereafter, a laminated support 36 is removed, if desired. Although there is only one discharging head unit 30 for fabrication in FIG. 2, the device may have two or more discharging head units 30.

Cured Matter

The cured matter of the present disclosure is formed by exposing at least one of the active energy ray curing composition of the present disclosure, the active energy ray curing ink composition of the present disclosure, or the active energy ray curing composition for inkjetting of the present disclosure to active energy rays.

The active energy ray curing composition can be the same as the active energy ray curing composition mentioned above, the active energy ray curing ink composition can be the same as the active energy ray curing ink composition mentioned above, and the active energy ray curing inkjet ink composition can be the same as the active energy ray curing inkjet ink composition mentioned above.

Decorative Object

The decorative object of the present disclosure includes a substrate and the cured matter of the present disclosure. It has a surface decoration of the cured matter on the substrate and other optional members.

The substrate is not particularly limited. It can suitably be selected to suit to a particular application. Specific examples include, but are not limited to, paper, string, fiber, fabrics, leather, metal, plastic, glass, wood, ceramics, or composite materials thereof.

The form of the substrate can be a planar form or a non-planar form such as a cylindrical form.

Laminate

The laminate of the present disclosure contains glass plate, cured matter of at least one of the active energy ray curing composition of the present disclosure, the active energy ray curing ink composition of the present disclosure, or the active energy ray curing inkjet ink composition of the present disclosure laminated on the glass plate, a resin film laminated on the cured matter, and other optional members.

The cured matter preferably has an average thickness of from 5 to 20 μm. An average thickness of the layer of the cured matter of from 5 to 20 μm enhances the adhesion between the glass plate and the resin film and the flexibility of an obtained laminate.

Member for Flexible Device

The member for a flexible device of the present disclosure includes the laminate of the present disclosure and other optional members.

Flexible Device

The flexible device of the present disclosure includes the laminate of the present disclosure and other optional members.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Examples 1 to 27

Preparation of Active Energy Ray Curing Compositions 1 to 27

The recipes shown in Tables 1 to 7 were mixed and stirred by a typical method to prepare active energy ray curing compositions 1 to 27.

Firstly, each monomer, polyester resin, and polymerization inhibitor were mixed and stirred to dissolve the polyester resin and the polymerization inhibitor. Next, the polymerization initiator was added and dissolved by mixing and stirring to obtain an active energy ray curing composition.

A stirrer, three-one motor (manufactured by SHINTO Scientific Co., Ltd.), was used at room temperature during the stirring.

TABLE 1

| | | Preparation Example | | | |
|---|---|---|---|---|---|
| | | 1 | 2 | 3 | 4 |
| Polymerizable monomer having a phosphoric acid ester group | SR9050NS, monofunctional monomer | 5.0 | | 5.0 | 5.0 |
| | SR9051NS, trifunctional monomer | | | | |
| | Light Acrylate P-1A (N), monofunctional monomer | | 5.0 | | |
| Polyester resin | UVAD-081, number average molecular weight of 1,400, with an unsaturated bond | 9.0 | 9.0 | 9.0 | 9.0 |
| | UVAD-085, number average molecular weight of 2,000, with an unsaturated bond | | | | |
| | VYLON GK-810, number average molecular weight of 6,000 | | | | |
| | VYLON 802, number average molecular weight of 3,000 | | | | |
| Other monofunctional monomer | Cyclic trimethyhlol propane formal monoacrylate | 36.3 | 36.3 | 33.3 | 28.3 |
| | Tetrahydro furfuryl acrylate | 40.0 | 40.0 | 33.0 | 33.0 |
| Other polyfunctional monomer | Dipropylene glycol diacrylate | | | 10.0 | 15.0 |
| | Trimethylol propane triacrylate | | | | |
| Polymerization initiator | Omnirad TPO | 6.7 | 6.7 | 6.7 | 6.7 |
| | Omnirad 819 | 2.9 | 2.9 | 2.9 | 2.9 |
| Polymerization inhibitor | BHT | 0.1 | 0.1 | 0.1 | 0.1 |
| | Total | 100 | 100 | 100 | 100 |

TABLE 2

| | | Preparation Example | | | |
|---|---|---|---|---|---|
| | | 5 | 6 | 7 | 8 |
| Polymerizable monomer having a phosphoric acid ester group | SR9050NS, monofunctional monomer | 5.0 | 5.0 | | |
| | SR9051NS, trifunctional monomer | | | 1.0 | 3.0 |
| | Light Acrylate P-1A (N), monofunctional monomer | | | | |
| Polyester resin | UVAD-081, number average molecular weight of 1,400, with an unsaturated bond | 9.0 | 9.0 | 9.0 | 9.0 |
| | UVAD-085, number average molecular weight of 2,000, with an unsaturated bond | | | | |
| | VYLON GK-810, number average molecular weight of 6,000 | | | | |
| | VYLON 802, number average molecular weight of 3,000 | | | | |
| Other monofunctional monomer | Cyclic trimethyhlol propane formal monoacrylate | 20.3 | 33.3 | 36.3 | 34.3 |
| | Tetrahydro furfuryl acrylate | 28.0 | 35.0 | 36.0 | 36.0 |
| Other | Dipropylene glycol diacrylate | 28.0 | | | |

TABLE 2-continued

|  |  | Preparation Example | | | |
|---|---|---|---|---|---|
|  |  | 5 | 6 | 7 | 8 |
| polyfunctional monomer | Trimethylol propane triacrylate |  | 8.0 | 8.0 | 8.0 |
| Polymerization initiator | Omnirad TPO | 6.7 | 6.7 | 6.7 | 6.7 |
|  | Omnirad 819 | 2.9 | 2.9 | 2.9 | 2.9 |
| Polymerization inhibitor | BHT | 0.1 | 0.1 | 0.1 | 0.1 |
|  | Total | 100 | 100 | 100 | 100 |

TABLE 3

|  |  | Preparation Example | | | |
|---|---|---|---|---|---|
|  |  | 9 | 10 | 11 | 12 |
| Polymerizable monomer having a phosphoric acid ester group | SR9050NS, monofunctional monomer |  |  | 10.0 | 15.0 |
|  | SR9051NS, trifunctional monomer | 10.0 | 15.0 |  |  |
|  | Light Acrylate P-1A (N), monofunctional monomer |  |  |  |  |
| Polyester resin | UVAD-081, number average molecular weight of 1,400, with an unsaturated bond | 9.0 | 9.0 | 9.0 | 9.0 |
|  | UVAD-085, number average molecular weight of 2,000, with an unsaturated bond |  |  |  |  |
|  | VYLON GK-810, number average molecular weight of 6,000 |  |  |  |  |
|  | VYLON 802, number average molecular weight of 3,000 |  |  |  |  |
| Other monofunctional monomer | Cyclic trimethyhlol propane formal monoacrylate | 32.3 | 31.3 | 33.3 | 31.3 |
|  | Tetrahydro furfuryl acrylate | 31.0 | 35 | 38.0 | 35 |
| Other polyfunctional monomer | Di propylene glycol diacrylate |  |  |  |  |
|  | Trimethylol propane triacrylate | 8.0 |  |  |  |
| Polymerization initiator | Omnirad TPO | 6.7 | 6.7 | 6.7 | 6.7 |
|  | Omnirad 819 | 2.9 | 2.9 | 2.9 | 2.9 |
| Polymerization inhibitor | BHT | 0.1 | 0.1 | 0.1 | 0.1 |
|  | Total | 100 | 100 | 100 | 100 |

TABLE 4

|  |  | Preparation Example | | | |
|---|---|---|---|---|---|
|  |  | 13 | 14 | 15 | 16 |
| Polymerizable monomer having a phosphoric acid ester group | SR9050NS, monofunctional monomer |  |  |  | 5.0 |
|  | SR9051NS, trifunctional monomer | 5.0 | 5.0 | 5.0 |  |
|  | Light Acrylate P-1A (N), monofunctional monomer |  |  |  |  |
| Polyester resin | UVAD-081, number average molecular weight of 1,400, with an unsaturated bond | 9.0 | 3.0 | 1.0 | 17.0 |
|  | UVAD-085, number average molecular weight of 2,000, with an unsaturated bond |  |  |  |  |
|  | VYLON GK-810, number average molecular weight of 6,000 |  |  |  |  |
|  | VYLON 802, number average molecular weight of 3,000 |  |  |  |  |

TABLE 4-continued

|  |  | Preparation Example | | | |
|---|---|---|---|---|---|
|  |  | 13 | 14 | 15 | 16 |
| Other monofunctional monomer | Cyclic trimethyhlol propane formal monoacrylate | 34.3 | 35.3 | 37.3 | 35.3 |
|  | Tetrahydro furfuryl acrylate | 34.0 | 39.0 | 39.0 | 33.0 |
| Other polyfunctional monomer | Dipropylene glycol diacrylate | | | | |
|  | Trimethylol propane triacrylate | 8.0 | 8.0 | 8.0 | |
| Polymerization initiator | Omnirad TPO | 6.7 | 6.7 | 6.7 | 6.7 |
|  | Omnirad 819 | 2.9 | 2.9 | 2.9 | 2.9 |
| Polymerization inhibitor | BHT | 0.1 | 0.1 | 0.1 | 0.1 |
|  | Total | 100 | 100 | 100 | 100 |

TABLE 5

|  |  | Preparation Example | | | |
|---|---|---|---|---|---|
|  |  | 17 | 18 | 19 | 20 |
| Polymerizable monomer having a phosphoric acid ester group | SR9050NS, monofunctional monomer | 5.0 | 5.0 | 5.0 | 5.0 |
|  | SR9051NS, trifunctional monomer | | | | |
|  | Light Acrylate P-1A (N), monofunctional monomer | | | | |
| Polyester resin | UVAD-081, number average molecular weight of 1,400, with an unsaturated bond | 12.0 | | | |
|  | UVAD-085, number average molecular weight of 2,000, with an unsaturated bond | | 9.0 | | |
|  | VYLON GK-810, number average molecular weight of 6,000 | | | 9.0 | |
|  | VYLON 802, number average molecular weight of 3,000 | | | | 9.0 |
| Other monofunctional monomer | Cyclic trimethyhlol propane formal monoacrylate | 37.3 | 36.3 | 36.3 | 36.3 |
|  | Tetrahydro furfuryl acrylate | 36.0 | 40.0 | 40 | 40 |
| Other polyfunctional monomer | Dipropylene glycol diacrylate | | | | |
|  | Trimethylol propane triacrylate | | | | |
| Polymerization initiator | Omnirad TPO | 6.7 | 6.7 | 6.7 | 6.7 |
|  | Omnirad 819 | 2.9 | 2.9 | 2.9 | 2.9 |
| Polymerization inhibitor | BHT | 0.1 | 0.1 | 0.1 | 0.1 |
|  | Total | 100 | 100 | 100 | 100 |

TABLE 6

|  |  | Preparation Example | | | |
|---|---|---|---|---|---|
|  |  | 21 | 22 | 23 | 24 |
| Polymerizable monomer having a phosphoric acid ester group | SR9050NS, monofunctional monomer | | 5.0 | | |
|  | SR9051NS, trifunctional monomer | | | | |
|  | Light Acrylate P-1A (N), monofunctional monomer | | | | |
| Polyester resin | UVAD-081, number average molecular weight of 1,400, with an unsaturated bond | | | 9.0 | 20.0 |
|  | UVAD-085, number average molecular weight of 2,000, with an unsaturated bond | | | | |
|  | VYLON GK-810, number average | | | | |

TABLE 6-continued

|  |  | Preparation Example | | | |
|---|---|---|---|---|---|
|  |  | 21 | 22 | 23 | 24 |
|  | molecular weight of 6,000 | | | | |
|  | VYLON 802, number average molecular weight of 3,000 | | | | |
| Other monofunctional monomer | Cyclic trimethyhlol propane formal monoacrylate | 47.3 | 45.3 | 41.3 | 35.3 |
|  | Tetrahydro furfuryl acrylate | 43.0 | 40.0 | 40.0 | 35.0 |
| Other polyfunctional monomer | Dipropylene glycol diacrylate | | | | |
|  | Trimethylol propane triacrylate | | | | |
| Polymerization initiator | Omnirad TPO | 6.7 | 6.7 | 6.7 | 6.7 |
|  | Omnirad 819 | 2.9 | 2.9 | 2.9 | 2.9 |
| Polymerization inhibitor | BHT | 0.1 | 0.1 | 0.1 | 0.1 |
|  | Total | 100 | 100 | 100 | 100 |

TABLE 7

|  |  | Preparation Example | | |
|---|---|---|---|---|
|  |  | 25 | 26 | 27 |
| Polymerizable monomer having a phosphoric acid ester group | SR9050NS, monofunctional monomer | | | |
|  | SR9051NS, trifunctional monomer | 5.0 | | |
|  | Light Acrylate P-1A (N), monofunctional monomer | | 5.0 | |
| Polyester resin | UVAD-081, number average molecular weight of 1,400, with an unsaturated bond | | | |
|  | UVAD-085, number average molecular weight of 2,000, with an unsaturated bond | | | 9.0 |
|  | VYLON GK-810, number average molecular weight of 6,000 | | | |
|  | VYLON 802, number average molecular weight of 3,000 | | | |
| Other monofunctional monomer | Cyclic trimethyhlol propane formal monoacrylate | 45.3 | 45.3 | 41.3 |
|  | Tetrahydro furfuryl acrylate | 40.0 | 40.0 | 40.0 |
| Other polyfunctional monomer | Dipropylene glycol diacrylate | | | |
|  | Trimethylol propane triacrylate | | | |
| Polymerization initiator | Omnirad TPO | 6.7 | 6.7 | 6.7 |
|  | Omnirad 819 | 2.9 | 2.9 | 2.9 |
| Polymerization inhibitor | BHT | 0.1 | 0.1 | 0.1 |
|  | Total | 100 | 100 | 100 |

Details of the materials used are as follows.
Polymerizable Monomer Having Phosphoric Acid Ester Group
   SR9050NS: one functional group, manufactured by Sartomer Company
   SR9051NS: three functional groups, manufactured by Sartomer Company Light Acrylate P-1A (N): 2-acryloyloxy ethylacid phosphate, one functional group, manufactured by Kyoeisha Chemical Co., Ltd.
Polyester Resin
   UVAD-081: polyester resin having an unsaturated bond, number average molecular weight of 1,400, manufactured by OSAKA SODA CO., LTD.
   UVAD-085: polyester resin having an unsaturated bond, number average molecular weight of 2,000, manufactured by OSAKA SODA CO., LTD.
   VYLON GK-810: number average molecular weight of 6,000, manufactured by TOYOBO CO., LTD.
   VYLON 802: number average molecular weight of 3,000, manufactured by TOYOBO CO., LTD.
Other Polymerizable Compound
   Cyclic trimethylol propane formal acrylate: manufactured by OSAKA ORGANIC CHEMICAL INDUSTRY LTD.
   Tetrahydrofurfuryl acrylate, manufactured by OSAKA ORGANIC CHEMICAL INDUSTRY LTD.
   Dipropylene diglycol diacrylate, manufactured by Tokyo Chemical Industry Co., Ltd.
   Trimethylol propane triacrylate: manufactured by OSAKA ORGANIC CHEMICAL INDUSTRY LTD.
Polymerization Initiator
   OMNIRAD TPO: manufactured by IGM Resins B.V.

OMNIRAD 819: manufactured by IGM Resins B.V.
Polymerization Inhibitor
BHT: manufactured by Tokyo Chemical Industry Co. Ltd.
Preparation of Active Energy Curing Black Pigment Ink Composition A total of 15 parts of black pigment (MOGUL-E, carbon black, manufactured by Orion Engineered Carbons), 5 parts of a dispersant (BYK167, manufactured by BYK-Chemie GmbH), and 80 parts of tetrahydrofurfuryl acrylate (manufactured by OSAKA ORGANIC CHEMICAL INDUSTRY LTD.) were placed in a 300 mL ball mill filled with zirconia beads having a diameter of 2 mm with a filling ratio of 43 volume percent, followed by dispersing at a dispersion temperature of 25 degrees C. at 70 rotations per minute (rpm) for 180 hours to prepare a black pigment dispersion.

The recipes shown in Table 8 were mixed to prepare active energy ray curing black pigment ink compositions 1 to 3.

Firstly, each monomer and polymerization inhibitor were mixed and stirred to dissolve the polymerization inhibitor. Next, the polymerization initiator was added and dissolved by mixing and stirring. Then black pigment dispersion was added and stirred to obtain an active energy ray curing black pigment ink composition.

A stirrer, three-one motor (manufactured by SHINTO Scientific Co., Ltd.), was used at room temperature during the stirring.

TABLE 8

| | | Active energy ray curing black pigment ink composition | | |
|---|---|---|---|---|
| | | 1 | 2 | 3 |
| Monofunctional monomer | Tetrahydro furfuryl acrylate | 34.4 | 27.4 | 20.4 |
| | Cyclic trimethylhlol propane formal monoacrylate | 43.0 | 30.0 | 27.0 |
| Polyfunctional monomer | Dipropylene glycol diacrylate | | 15.0 | 20.0 |
| | Trimethylol propane triacrylate | | 5.0 | 10.0 |
| Polymerization initiator | Omnirad TPO | 7.0 | 7.0 | 7.0 |
| | Omnirad 819 | 2.5 | 2.5 | 2.5 |
| Polymerization inhibitor | BHT | 0.1 | 0.1 | 0.1 |
| Black pigment dispersion | | 13 | 13 | 13 |
| Total | | 100 | 100 | 100 |

Example 1

The active energy ray curing composition obtained in Preparation Example 1 was loaded in an inkjet printer including an inkjet head, MH5420 manufactured by Ricoh Co., Ltd., and a metal halide lamp (3,000 mj/cm$^2$). A 4 cm square solid image was printed on a glass substrate (S9213, manufactured by Matsunami Glass Ind., Ltd.) with a gap of 1 mm between the head and the substrate surface to achieve an amount of adhered to the substrate of 1.5 mg/cm$^2$. Printed matter 1 was thus obtained.

Examples 2 to 20 and Comparative Examples 1 to 7

Printed matters 2 to 20 and 24 to 30 were obtained in the same manner as in Example 1 except that the active energy ray curing composition of Preparation Example 1 was changed to the active energy ray curing compositions of Preparation Examples 2 to 27.

Example 21

The active energy ray curing composition of Preparation Example 1 was loaded in an inkjet printer including an inkjet head, MH5420 manufactured by Ricoh Co., Ltd., and a metal halide lamp (3,000 mj/cm$^2$, manufactured by USHIO INC.). A 4 cm square solid image was printed on a glass substrate (S9213, manufactured by Matsunami Glass Ind., Ltd.) with a gap of 1 mm between the head and the substrate surface to achieve an amount adhered to the substrate of 1.5 mg/cm$^2$.

Sequentially, the active energy ray curing black pigment ink composition 1 obtained in Preparation Example 24 was printed on the printed active energy ray curing black pigment ink composition of Preparation Example 1 to obtain printed matter 21. Specifically, the active energy ray curing black pigment ink composition 1 obtained was loaded in an inkjet printer including an inkjet head, MH5420 manufactured by Ricoh Co., Ltd., and a metal halide lamp (3,000 mj/cm$^2$, manufactured by USHIO INC.). A 4 cm square solid image was printed with a gap of 1 mm between the head and the substrate surface to achieve an amount adhered to the substrate of 1.5 mg/cm$^2$.

Examples 22 and 23

Printed matters 22 and 23 were obtained in the same manner as in Example 21 except that the active energy ray curing black pigment ink composition 1 was changed to the active energy ray black pigment ink composition 2 or 3.

Adhesion after immersion in hot water and adhesion after immersion in an alkali solution of the printed matters 1 to 30 obtained in Examples 1 to 23 and Comparative Examples 1 to 7 were evaluated in the following manner using the active energy ray curing compositions of Preparation Examples 1 to 27. The results are shown in Table 9.

Adhesion after Dipping in Hot Water

The entire of the obtained printed matter including the image portion and the substrate was dipped in hot water heated to 90 degrees C. for 20 minutes.

Immediately after the printed matter was taken out, the surface of the image was cleared of the droplets of hot water and subjected to a tape peeling-off test.

In the test, a tape (CT-24, manufactured by Nichiban Co., Ltd.) was attached and pressed firmly to the image portion. Then the tape was peeled from the image surface at once to the direction of 90 degrees to the image surface. Thereafter, the image surface was visually checked to evaluate the adhesion according to the following evaluation criteria. Peeling-off of image in the evaluation criteria means that cured matter of the active energy ray curing composition was peeled off.

Evaluation Criteria
  S: Image was not peeled after tape peeling
  A: Image was slightly peeled after tape peeling
  C: Image was peeled over entire surface after tape peeling or peeled during immersion in hot water Adhesion after Dipping in Alkali Solution The entire of the obtained printed matter including the image portion and the substrate was dipped in an aqueous solution of sodium hydroxide at 3 percent by mass heated to 80 degrees C. for 20 minutes.

Immediately after the printed matter was taken out, the surface of the image was cleared of the droplets of hot water and subjected to a tape peeling-off test.

In the test, a tape (CT-24, manufactured by Nichiban Co., Ltd.) was attached and pressed firmly to the image portion. Then the tape was peeled from the image surface at once to the direction of 90 degrees to the image surface. Thereafter, the image surface was visually checked to evaluate the adhesion according to the following evaluation criteria. Peeling-off of image in the evaluation criteria means that cured matter of the active energy ray curing composition was peeled off.

Evaluation Criteria
   S: Image was not peeled after tape peeling
   A: Image was slightly peeled after tape peeling
   C: image was peeled over entire surface after tape peeling or peeled during immersion in aqueous solution of sodium hydroxide at 3 percent by mass Discharging Stability The active energy ray curing compositions of Preparation Examples 1 to 27 each were loaded in an extensive applicator EV2500 (manufactured by Ricoh Co., Ltd.) equipped with an inkjet head MH5420 (manufactured by Ricoh Co., Ltd.). The head continuously discharged the active energy ray curing composition for 30 minutes with the composition inside the head heated and the state of discharging was observed with a camera to evaluate the adhesion according to the following evaluation criteria.

One discharging array of the four was subjected to the observation of the state of discharging.

Evaluation Criteria
   S: Discharged from all nozzles
   A: Not discharged from 1 to 14 nozzles
   B: Not discharged from 15 to 29 nozzles
   C: Not discharged from 30 or more nozzles

TABLE 9

|  |  |  |  | Evaluation result | | |
| --- | --- | --- | --- | --- | --- | --- |
|  |  | Active energy ray curing composition | Active energy ray curing black pigment ink composition | Adhesion after immersion in hot water | Adhesion after immersion in alkali solution | Discharging stability |
| Example | 1 | Preparation Example 1 | None | A | A | S |
|  | 2 | Preparation Example 2 | None | A | A | S |
|  | 3 | Preparation Example 3 | None | S | S | S |
|  | 4 | Preparation Example 4 | None | S | S | S |
|  | 5 | Preparation Example 5 | None | A | A | S |
|  | 6 | Preparation Example 6 | None | S | S | S |
|  | 7 | Preparation Example 7 | None | A | A | S |
|  | 8 | Preparation Example 8 | None | S | S | S |
|  | 9 | Preparation Example 9 | None | S | S | S |
|  | 10 | Preparation Example 10 | None | S | S | A |
|  | 11 | Preparation Example 11 | None | A | A | S |
|  | 12 | Preparation Example 12 | None | S | S | A |
|  | 13 | Preparation Example 13 | None | S | S | S |
|  | 14 | Preparation Example 14 | None | S | S | S |
|  | 15 | Preparation Example 15 | None | A | A | S |
|  | 16 | Preparation Example 16 | None | A | A | B |
|  | 17 | Preparation Example 17 | None | A | A | A |
|  | 18 | Preparation Example 18 | None | A | A | S |
|  | 19 | Preparation Example 19 | None | A | A | B |
|  | 20 | Preparation Example 20 | None | A | A | S |
|  | 21 | Preparation Example 1 | 1 | A | A | S |
|  | 22 | Preparation Example 1 | 2 | A | A | S |
|  | 23 | Preparation Example 1 | 3 | A | A | S |
| Comparative Example | 1 | Preparation Example 21 | None | C | C | S |

TABLE 9-continued

| | | Active energy ray curing composition | Active energy ray curing black pigment ink composition | Evaluation result | | |
|---|---|---|---|---|---|---|
| | | | | Adhesion after immersion in hot water | Adhesion after immersion in alkali solution | Discharging stability |
| 2 | | Preparation Example 22 | None | C | C | S |
| 3 | | Preparation Example 23 | None | C | C | S |
| 4 | | Preparation Example 24 | None | C | C | C |
| 5 | | Preparation Example 25 | None | C | C | S |
| 6 | | Preparation Example 26 | None | C | C | S |
| 7 | | Preparation Example 27 | None | C | C | S |

Adhesion of laminate was evaluated for the active energy ray curing compositions of Preparation Examples 1, 3, 8, 9, 13, 14, 18, and 21 in the following manner. The results are shown in Table 10.

Adhesion of Laminate

The prepared active energy ray curing composition was applied onto the entire region of a polyester film (A4360, thickness of 75 m, manufactured by TOYOBO CO., LTD.) along the width direction of the substrate, perpendicular to the application direction, to obtain an average thickness of 10 m after curing. A glass plate (G-leaf, manufactured by Nippon Electric Glass Co., Ltd.) was laminated onto the active energy ray curing composition applied, followed by irradiation of ultraviolet radiation with a light emitting diode (LED) irradiator (365 nm, 3,000 mL/cm$^2$, manufactured by Heraeus Holding) irradiating to create a laminate.

A cut was made to the end part of the polyester film of the laminate created. The polyester film was pulled and peeled off with a hand from the cut to evaluate the adhesion according to the following evaluation criteria.

Evaluation Criteria
A: Not easily peeled
C: Easily peeled

TABLE 10

| | | Active energy ray curing composition | Adhesion of laminate |
|---|---|---|---|
| Example | 24 | Preparation Example 1 | A |
| | 25 | Preparation Example 3 | A |
| | 26 | Preparation Example 8 | A |
| | 27 | Preparation Example 9 | A |
| | 28 | Preparation Example 13 | A |
| | 29 | Preparation Example 14 | A |
| | 30 | Preparation Example 18 | A |
| Comparative Example | 8 | Preparation Example 21 | C |

Aspects of the present disclosure are, for example, as follows.

1. An active energy ray curing composition contains a polymerizable monomer having a phosphoric acid ester group and a polyester resin having an unsaturated bond and a number average molecular weight of 3,000 or less.

2. The active energy ray curing composition according to 1 mentioned above further contains a polyfunctional monomer having two or more polymerizable functional groups in a molecule.

3. The active energy ray curing composition according to 2 mentioned above, wherein the polyfunctional monomer accounts for 25 percent by mass of the entire of the active energy ray curing composition.

4. The active energy ray curing composition according to any one of 1 to 3 mentioned above, wherein the polyester resin accounts for 3 to 15 percent by mass of an entire of the active energy ray curing composition.

5. The active energy ray curing composition according to any one of 1 to 4 mentioned above, wherein the polyester resin has a number average molecular weight of 2,000 or less.

6. The active energy ray curing composition according to any one of 1 to 5 mentioned above, wherein the polymerizable monomer accounts for 3 to 10 percent by mass of an entire of the active energy ray curing composition.

7. The active energy ray curing composition according to any one of 1 to 6 mentioned above, wherein the polymerizable monomer comprises a polyfunctional monomer having two or more polymerizable functional groups in a molecule.

8. The active energy ray curing composition according to 7 mentioned above, wherein the polymerizable monomer contains a polyfunctional monomer having three polymerizable functional groups in the molecule.

9. The active energy ray curing composition according to any one of 1 to 8 mentioned above for a glass substrate.

10. An active energy ray curing ink composition contains the active energy ray curing composition according to any one of 1 to 9 mentioned above.

11. An active energy ray curing inkjet ink composition contains the active energy ray curing ink composition according to 10 mentioned above.

12. A composition container includes a container containing at least one of the active energy ray curing composition of any one of 1 to 9 mentioned above, an active energy ray curing ink composition containing the active energy ray curing composition, and an active energy ray curing inkjet ink composition containing the active energy ray curing ink composition.

13. An apparatus for forming a two-dimensional or three-dimensional image includes the composition container of 12 mentioned above and an irradiator for emitting active energy rays.

14. A method of forming a two-dimensional or three-dimensional image, comprising:
exposing at least one of the active energy ray curing composition of any one of 1 to 9 mentioned above, an active energy ray curing ink composition containing the active energy ray curing composition, and an active energy ray curing inkjet ink composition containing the active energy ray curing ink composition to active energy ray.

15. Cured matter produced by a method of curing at least one of the active energy ray curing composition of any one of 1 to 9 mentioned above, an active energy ray curing ink composition containing the active energy ray curing composition, and an active energy ray curing inkjet ink composition containing the active energy ray curing ink composition to active energy rays.

16. A decorative object includes a substrate and a surface decoration of the cured matter of 15 mentioned above on the substrate.

17. The decorative object according to 16 mentioned above, wherein the substrate has a cylindrical form.

18. A laminate includes a glass substrate, cured matter of at least one of the active energy ray curing composition of any one of 1 to 9 mentioned above, an active energy ray curing ink composition containing the active energy ray curing composition, and an active energy ray curing inkjet ink composition containing the active energy ray curing ink composition laminated on the glass substrate, and a resin film laminated on the cured matter.

19. A member for flexible device includes the laminate of 18 mentioned above.

20. A flexible device includes the laminate of 18 mentioned above.

21. An active energy ray curing composition contains a polymerizable monomer having a phosphoric acid ester group and a polyester resin having an unsaturated bond, wherein the polyester resin accounts for 3 to 15 percent by mass of the active energy ray curing composition.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An active energy ray curing composition, comprising:
a polymerizable monomer having a phosphoric acid ester group;
a polyester resin having an unsaturated bond and a number average molecular weight of 3,000 or less; and
a polyfunctional monomer having two or more polymerizable functional groups in a molecule;
wherein a content of the polyfunctional monomer is 10 percent by mass or less of a total mass of the active energy ray curing composition.

2. The active energy ray curing composition according to claim 1,
wherein the polyester resin accounts for 3 to 15 percent by mass of an entire of the active energy ray curing composition.

3. The active energy ray curing composition according to claim 1,
wherein the polyester resin has a number average molecular weight of 2,000 or less.

4. The active energy ray curing composition according to claim 1,
wherein the polymerizable monomer accounts for 3 to 10 percent by mass of an entire of the active energy ray curing composition.

5. The active energy ray curing composition according to claim 1,
wherein the polymerizable monomer comprises a polyfunctional monomer having two or more polymerizable functional groups in a molecule.

6. The active energy ray curing composition according to claim 5,
wherein the polymerizable monomer comprises a polyfunctional monomer having three polymerizable functional groups in the molecule.

7. An active energy ray curing ink composition, comprising:
the active energy ray curing composition according to claim 1.

8. An active energy ray curing inkjet ink composition, comprising:
the active energy ray curing ink composition according to claim 7.

9. A composition container, comprising:
a container containing at least one of the active energy ray curing composition of claim 1, an active energy ray curing ink composition comprising the active energy ray curing composition of claim 1, or an active energy ray curing inkjet ink composition comprising the active energy ray curing ink composition of claim 1.

10. An apparatus for forming a two-dimensional or three-dimensional image, comprising:
the composition container of claim 9; and
an irradiator configured to emit active energy rays.

11. A method of forming a two-dimensional or three-dimensional image, comprising:
exposing at least one of the active energy ray curing composition of claim 1, an active energy ray curing ink composition comprising the active energy ray curing composition of claim 1, or an active energy ray curing inkjet ink composition comprising the active energy ray curing ink composition of claim 1 to active energy ray.

12. Cured matter produced by a method of curing at least one of: the active energy ray curing composition of claim 1, an active energy ray curing ink composition comprising the active energy ray curing composition of claim 1, or an active energy ray curing inkjet ink composition comprising the active energy ray curing ink composition of claim 1 to active energy rays.

13. A decorative object, comprising:
a substrate; and
a surface decoration of the cured matter of claim 12 on the substrate.

14. The decorative object according to claim 13, wherein the substrate has a cylindrical form.

15. A laminate, comprising:
a glass substrate;
cured matter of at least one of the active energy ray curing composition of claim 1, an active energy ray curing ink composition comprising the active energy ray curing composition of claim 1, or an active energy ray curing inkjet ink composition comprising the active energy ray curing ink composition of claim 1 laminated on the glass substrate; and
a resin film laminated on the cured matter.

16. A member for flexible device, comprising;
the laminate of claim 5.

17. A flexible device, comprising;
the laminate of claim 5.

18. An active energy ray curing composition, comprising:
a polymerizable monomer having a phosphoric acid ester group;
a polyester resin having an unsaturated bond,
wherein the polyester resin accounts for 3 to 15 percent by mass of the active energy ray curing composition; and
a polyfunctional monomer having two or more polymerizable functional groups in a molecule;
wherein a content of the polyfunctional monomer is 10 percent by mass or less of a total mass of the active energy ray curing composition.

19. An active energy ray curing composition for a glass substrate, comprising:
a polymerizable monomer having a phosphoric acid ester group;
a polyester resin having an unsaturated bond and a number average molecular weight of 3,000 or less; and
a polyfunctional monomer having two or more polymerizable functional groups in a molecule;
wherein a content of the polyfunctional monomer is 10 percent by mass or less of a total mass of the active energy ray curing composition.

* * * * *